(12) United States Patent
Lee (10) Patent No.: US 11,792,727 B2
(45) Date of Patent: Oct. 17, 2023

(54) NON-IP DATA DELIVERY AUTHORIZATION UPDATE METHOD AND CONNECTION RELEASE METHOD FOR NON-IP DATA DELIVERY, AND DEVICE FOR PERFORMING THE METHOD

(71) Applicant: Electronics and Telecommunications Research Institute, Daejeon (KR)

(72) Inventor: Seung-Ik Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/572,699

(22) Filed: Jan. 11, 2022

(65) Prior Publication Data

US 2022/0132412 A1 Apr. 28, 2022

Related U.S. Application Data

(63) Continuation of application No. 16/704,158, filed on Dec. 5, 2019, now Pat. No. 11,252,652.

(30) Foreign Application Priority Data

| Apr. 2, 2019 | (KR) | 10-2019-0038451 |
| Apr. 2, 2019 | (KR) | 10-2019-0038465 |
| Nov. 29, 2019 | (KR) | 10-2019-0157332 |

(51) Int. Cl.
*H04W 48/18* (2009.01)
*H04W 4/12* (2009.01)
*H04W 8/18* (2009.01)
*H04W 36/00* (2009.01)
*H04W 76/14* (2018.01)
*H04W 80/10* (2009.01)
*H04W 76/12* (2018.01)
*H04W 88/14* (2009.01)
*H04W 88/16* (2009.01)
*H04W 4/70* (2018.01)
(Continued)

(52) U.S. Cl.
CPC ............ *H04W 48/18* (2013.01); *H04W 4/12* (2013.01); *H04W 8/18* (2013.01); *H04W 36/0011* (2013.01); *H04W 36/14* (2013.01); *H04W 76/11* (2018.02); *H04W 80/10* (2013.01)

(58) Field of Classification Search
CPC ....... H04W 48/18; H04W 4/12; H04W 76/11; H04W 76/12; H04W 88/14; H04W 88/16; H04W 8/18; H04W 36/0011; H04W 80/10; H04W 36/14; H04W 4/70
USPC ...................................................... 370/329
See application file for complete search history.

(56) References Cited

U.S. PATENT DOCUMENTS

| 2017/0006469 A1 | 1/2017 | Palanigounder |
| 2017/0295529 A1 | 10/2017 | Kang et al. |

(Continued)

FOREIGN PATENT DOCUMENTS

| WO | WO 2017/119802 A1 | 7/2017 |
| WO | WO 2018/000867 A1 | 1/2018 |

*Primary Examiner* — Inder P Mehra
(74) *Attorney, Agent, or Firm* — NSIP Law (57) ABSTRACT

Disclosed are a non-IP data delivery (NIDD) authorization update method and connection release method for the non-IP data delivery and device for performing the method. The NIDD authorization update method is initiated by a UDM device, and the connection release method between a SMF device and a NEF device is initiated by the SMF device or the NEF device.

3 Claims, 6 Drawing Sheets

(51) Int. Cl.
   *H04W 76/11* (2018.01)
   *H04W 36/14* (2009.01)

(56) References Cited

U.S. PATENT DOCUMENTS

| | | |
|---|---|---|
| 2018/0278380 A1 | 9/2018 | Kim et al. |
| 2019/0069194 A1 | 2/2019 | Jun et al. |
| 2019/0215731 A1 | 7/2019 | Qiao et al. |
| 2019/0223250 A1 | 7/2019 | Dao et al. |
| 2019/0261260 A1 | 8/2019 | Dao et al. |
| 2019/0261453 A1* | 8/2019 | Jain ................ H04W 8/08 |
| 2019/0274189 A1* | 9/2019 | Jain ................ H04W 8/22 |
| 2019/0306251 A1 | 10/2019 | Talebi Fard et al. |
| 2019/0394712 A1 | 12/2019 | Ronneke |
| 2020/0213290 A1 | 7/2020 | Tan et al. |
| 2021/0014765 A1 | 1/2021 | Shan et al. |

* cited by examiner

NON-IP DATA DELIVERY AUTHORIZATION UPDATE METHOD AND CONNECTION RELEASE METHOD FOR NON-IP DATA DELIVERY, AND DEVICE FOR PERFORMING THE METHOD

CROSS-REFERENCE TO RELATED APPLICATION(S)

This application is a Continuation Application of U.S. patent application Ser. No. 16/704,158, filed on Dec. 5, 2019, now U.S. Pat. No. 11,252,652 issued on Feb. 15, 2022, which claims the priority benefit of Korean Patent Application No. 10-2019-0038451 filed on Apr. 2, 2019, No. 10-2019-0038465 filed on Apr. 2, 2019, and No. 10-2019-0157332 filed on Nov. 29, 2019 in the Korean Intellectual Property Office, the disclosures of which are incorporated herein by reference for all purposes.

BACKGROUND

1. Field of the Invention

One or more example embodiments relate to a non-IP data delivery authorization update method and connection release method for non-IP data delivery and device for performing the method.

2. Description of the Related Art

Currently, in the case of 5G network technology, a combination between the core network and the IoT communication infrastructure is proposed. At this time, 5G Cellular IoT (CIoT) technology is being considered as an extension structure for realizing low power, low cost, high volume, high reliability, and low latency of IoT communication.

In this case, IoT devices that perform IoT communication often do not support the IP stack. There is a demand for a method of supporting non-IP data transmission generated from such IoT devices.

SUMMARY

According to an aspect, there is provided a method of connection establishment between a Session Management Function (SMF) device and the Network Exposure Function (NEF) device, performed by the NEF device. The method includes receiving a Nnef_SMContext_Create Request message from the SMF device; and transmitting Nnef_SMContext_Create Request Response message to the SMF device to allow a Protocol Data Unit (PDU) session establishment into the NEF device.

The NEF device generates NEF PDU session context when the Nnef_SMContext_Create Request message, and associates the NEF PDU session context with a user identify (ID) and a PDU session ID.

The Nnef_SMContext_Create Request message includes a user ID, a PDU session ID, a NEF device ID, Non-IP Data Delivery (NIDD) information, S-NSSAI (Single Network Slice Selection Assistance Information), or Data Network Name (DNN).

The Nnef_SMContext_Create Request Response message includes the user ID, the PDU session ID, the NEF device ID, the NIDD information, the S-NSSAI and DNN.

According to an aspect, there is provided a method of Non-IP Data Delivery (NIDD) configuration performed by a Network Exposure Function (NEF) device. The method includes receiving a Nnef_NIDDConfiguration_Create Request message from an Application Function (AF) device; receiving a Nudm_NIDDAuthorisation_Get Request message to a Unified Data Management (UDM) device; receiving a Nudm_NIDDAuthorisation_Get Response message from the UDM device; and transmitting a Nnef_NIDDConfiguration_Create Response to the AF device.

The Nnef_NIDDConfiguration_Create Request message includes Generic Public Subscription Identifier (GPSI), External Group Identifier, AF device Identify (ID), NIDD Duration, T8 Destination Address, Requested Action, T8 Long Term Transaction Reference ID (TLTRI), Reliable Data Service Configuration or Machine Type Communication (MTC) Provider Information. The Nnef_NIDDConfiguration_Create Response includes TLTRI, Maximum Packet Size, Reliable Data Service Indication, or Cause.

The Nudm_NIDDAuthorisation_Get Request message includes GPSI, External Group Identifier, S-NSSAI, DNN, AF device ID or MTC Provider Information.

The Nudm_NIDDAuthorisation_Get Response message includes single value or list of SUPI and GPSI or Result.

According to an aspect, there is provided a method of Non-IP Data Delivery (NIDD) authorization update performed by Network Exposure Function (NEF) device. The method includes receiving a Nudm_NIDDAuthorisation_UpdateNotify Request message from a Unified Data Management (UDM) device; transmitting a Nudm_NIDDAuthorisation_UpdateNotify Response message to the UDM device; transmitting a Nnef_NIDDConfiguration_UpdateNotify Request message to an Application Function (AF) device; and receiving a Nnef_NIDDConfiguration_UpdateNotify Response message from the AF device.

The Nudm_NIDDAuthorisation_UpdateNotify Request message includes Subscription Permanent Identifier (SUPI), Generic Public Subscription Identifier (GPSI), Single Network Slice Selection Assistance Information (S-NSSAI), Data Network Name (DNN) or Result. The Nudm_NIDDAuthorisation_UpdateNotify Response message includes cause.

The Nnef_NIDDConfiguration_UpdateNotify Request message includes GPSI, T8 Long Term Transaction Reference ID (TLTRI) or Result.

According to an aspect, there is provided a method of a connection release between a Session Management Function (SMF) device and a Network Exposure Function (NEF) device, performed by the NEF device. The method includes receiving a Nnef_SMContext_Delete Request message from the SMF device; and transmitting a Nnef_SMContext_Delete Response message to the SMF device.

The Nnef_SMContext_Delete Request message includes User Identity (ID), Protocol Data Unit (PDU) session ID, NEF device ID, Single Network Slice Selection Assistance Information (S-NSSAI) or Data Network Name (DNN). And, the Nnef_SMContext_Delete Response message includes User Identity, PDU session ID, NEF device ID, S-NSSAI or DNN.

According to an aspect, there is provided a method of a connection release between a Session Management Function (SMF) device and a Network Exposure Function (NEF) device, performed by the NEF device. The method includes receiving a Nnef_NIDDConfiguration_Delete Request message from an Application Function (AF) device; transmitting a Nnef_NIDDConfiguration_Delete Response message to the AF device; transmitting a Nnef_SMContext_DeleteNotify Request message to the SMF device; and receiving a Nnef_SMContext_DeleteNotify Response message form the SMF device.

The Nnef_NIDDConfiguration_Delete Request message includes TLTRI to indicate that SMF-NEF connection for a User's NIDD is no longer needed, and the Nnef_NIDDConfiguration_Delete Response message is to acknowledge a deletion of a NIDD configuration.

The Nnef_SMContext_DeleteNotify Request message is message to notify a deletion of SM (Session Management) context information, and the Nnef_SMContext_DeleteNotify Response message is message to acknowledge a notification for deletion of the SM (Session Management) context information.

According to an aspect, there is provided a method of a connection release between a Session Management Function (SMF) device and a Network Exposure Function (NEF) device, performed by the NEF device. The method includes determining whether to release the corresponding SMF-NEF connection based on a NIDD authorization update; transmitting a Nnef_SMContext_DeleteNotify Request message to the SMF device; and receiving a Nnef_SMContext_DeleteNotify Response message from the SMF device.

The Nnef_SMContext_DeleteNotify Request message is a message to notify a deletion of SM context information, and the Nnef_SMContext_DeleteNotify Response message is a message to acknowledge a notification for the deletion of the SM context information.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

Definition of the Term Used in the Present Application

NIDD (Non-IP Data Delivery)
MO (Mobile Originated)
MT (Mobile Terminated)
UE (User Equipment)
NEF (Network Exposure Function)
SMF (Session Management Function)
AF (Application Function)
AMF (Access and Mobility Management Function)
UDM (Unified Data Management)
DNN (Data Network Name)
S-NSSAI (Single Network Slice Selection Assistance Information)
PDU (Protocol Data Unit)
External Group Identifier
GPSI (Generic Public Subscription Identifier)
SUPI (Subscription Permanent Identifier)
MTC (Machine Type Communication) Provider Information
TLTRI (T8 Long Term Transaction Reference ID)
NIDD Duration
Reliable Data Service Configuration
Reliable Data Service Indication <Non-IP Data Delivery (NIDD)>

Functions for NIDD may be used to handle Mobile Originated (MO) and Mobile Terminated (MT) communication with UEs, where the data used for the communication is considered unstructured (which we refer to also as Non-IP). Such delivery to the AF is accomplished by one of the following two mechanisms:

Delivery using the NIDD API;
Delivery using UPF via a Point-to-Point (PtP) N6 tunnel.

NIDD is handled using an Unstructured PDU session to the NEF. The UE may obtain an Unstructured PDU session to the NEF during the PDU Session Establishment procedure. Whether or not the NIDD API shall be invoked for a PDU session is determined by the presence of a "NEF Identity for NIDD" for the DNN/S-NSSAI combination in the subscription. If the subscription includes a "NEF Identity for NIDD" corresponding with the DNN and S-NSSAI information, then the SMF selects that NEF and uses the NIDD API for that PDU session. The NEF ID for a given DNN and S-NSSAI in the subscription can be updated by using the NIDD configuration procedure.

The NEF exposes the NIDD APIs on the N33/Nnef reference point. The NEF uses the provisioned policies to map an AF Identity and UE Identity to a DNN/S-NSSAI combination if the Reliable Data Service (RDS) is not enabled. If the RDS is enabled, the NEF determines the association based on RDS port numbers and the provisioned policies that may be used to map AF identity and User identity to a DNN.

The NEF also supports distribution of Mobile Terminated messages to a group of UEs based on the NIDD API. At inclusion of an External Group Identifier in the MT NIDD request, the NEF uses UDM to resolve the External Group Identifier to a list of SUPIs and sends the message to each UE in the group with an active PDU Session. The Protocol Configuration Options (PCO) may be used to transfer NIDD parameters to and from the UE (e.g. maximum packet size). The PCO is sent in the 5GSM signalling between UE and SMF. NIDD parameters are sent to and from the NEF via the N29 interface.

Support of Non-IP Data Delivery:

NEF provides a means for management of NIDD configuration and delivery of MO/MT unstructured data by exposing the NIDD APIs on the N33/Nnef reference point.

If a PDU session shall only use Control Plane CIoT 5GS Optimisation, the AMF provides a Control Plane Only Indicator to the SMF during the PDU session establishment. The SMF provides the Control Plane Only Indicator in the Session Management Request to the UE. A UE and SMF receiving the Control Plane Only Indicator for a PDU session shall always use the Control Plane CIoT 5GS Optimisation for this PDU session.

The following rules apply for the use of the Control Plane Only Indicator during PDU session establishment:

If N3 data transfer was not successfully negotiated, all PDU sessions shall include Control Plane Only Indicator.

If N3 data transfer was successfully negotiated then:

For a new PDU session of type unstructured towards a DNN/S-NSSAI for which the subscription includes a NEF Identity for NIDD (i.e. for a PDU session which will be anchored in NEF), the AMF shall always include the Control Plane Only Indicator.

For a new PDU session towards a DNN/S-NSSAI for which the subscription does not include a NEF Identity for NIDD (i.e. for a PDU session which will be anchored in UPF) and that AMF supports interworking with EPS based on the subscription data:

for the first PDU Session the AMF determines based on local policy whether to include the Control Plane Only Indicator or not;

if the AMF previously included a Control Plane Only Indicator for PDU sessions that support interworking with EPS based on the subscription data and that are anchored in UPF, the AMF shall include it also for the new PDU session;

if the AMF previously did not include a Control Plane Only Indicator for any of the PDU sessions that support interworking with EPS based on the subscription data and that are anchored in UPF, the AMF shall not include it for the new PDU session.

For a new PDU session towards a DNN/S-NSSAI for which the subscription does not include a NEF Identity for NIDD (i.e. for a PDU session which will be anchored in UPF) and that AMF does not support interworking with EPS based on the subscription data, AMF determines individually per PDU session whether to include the Control Plane Only Indicator or not.

If the AMF indicated Control Plane CIoT 5GS Optimisation in step 3 for this PDU session, then, 1) For Unstructured PDU Session Type, the SMF checks whether UE's subscription include a "NEF Identity for NIDD" for the DNN/S-NSSAI combination. When the "NEF Identity for NIDD" is present in the UE's subscription data, the SMF will select the NEF identified for the S-NSSAI and selected DNN in the "NEF Identity for NIDD" as the anchor of this PDU Session. Otherwise, the SMF will select a UPF as the anchor of this PDU Session.

Figure 1:
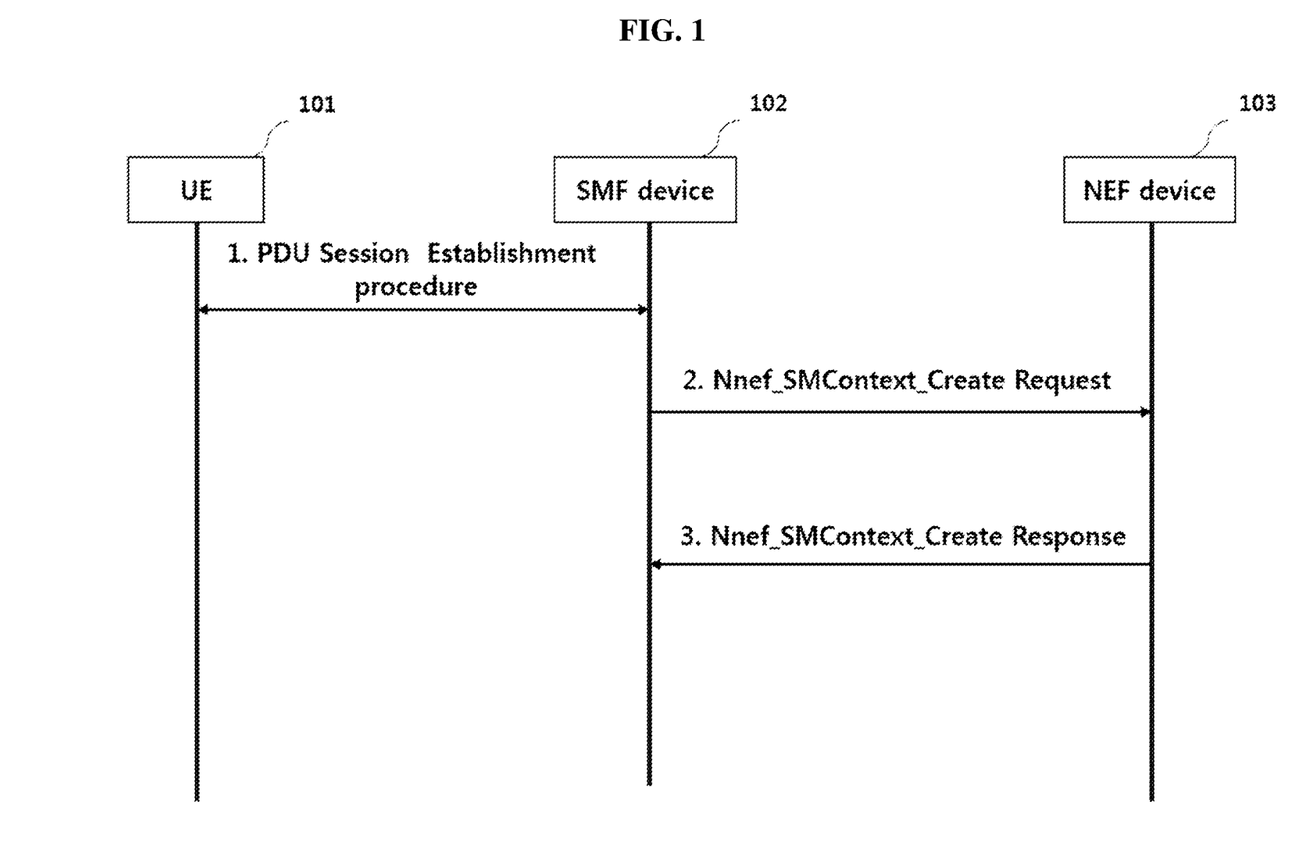
FIG. 1 is a diagram illustrating a flowchart for a connection establishment process between an SMF device and a NEF device for non-IP data delivery (NIDD) according to an embodiment of the present invention.

FIG. 1 is a diagram illustrating a flowchart for a connection establishment process between an SMF device and a NEF device for non-IP data delivery (NIDD) according to an embodiment of the present invention.

Non-IP Data Delivery (NIDD) it is a means for delivering data via a PDU Sessions of type "Unstructured". The subsequent description describes the procedures necessary to support NEF based NIDD.

<SMF-NEF Connection Establishment>

When the UE performs the PDU Session establishment with PDU Session type of "Unstructured", and the subscription information corresponding to the UE requested DNN includes the "NEF Identity for NIDD", then the SMF initiates a SMF-NEF Connection establishment procedure towards the NEF corresponding to the "NEF ID" for that DNN/S-NSSAI Combination.

1. The UE performs steps 1-10 of PDU Session Establishment Procedure. The SMF receives the Session Management Subscription data for the corresponding SUPI, DNN and S-NSSAI that is associated with NEF Identity for NIDD and NIDD information such GPSI and AF ID.

2. If the subscription information corresponding to DNN and S-NSSAI includes the "NEF Identity for NIDD", the SMF shall create a PDU session towards the NEF. The SMF invokes Nnef_SMContext_Create Request (User Identity, PDU session ID, NEF ID, NIDD information, S-NSSAI, DNN) message towards the NEF. The UE capability to support Reliable Data Service (RDS) is included in the PCO in the PDU Session Establishment Request message.

If no AF has previously performed the NIDD Configuration procedure with the NEF for the User Identity received in step 2, then the NEF initiates the NIDD Configuration procedure before step 3.

3. The NEF creates a NEF PDU session Context and associates it with User Identity and PDU session ID. The NEF invokes Nnef_SMContext_Create Request Response (User Identity, PDU session ID, NEF ID, S-NSSAI, DNN) towards the SMF confirming establishment of the PDU session to the NEF for the UE. If NEF supports and allows use of RDS, it indicate that to SMF and the SMF includes it in the PCO.

Figure 2:
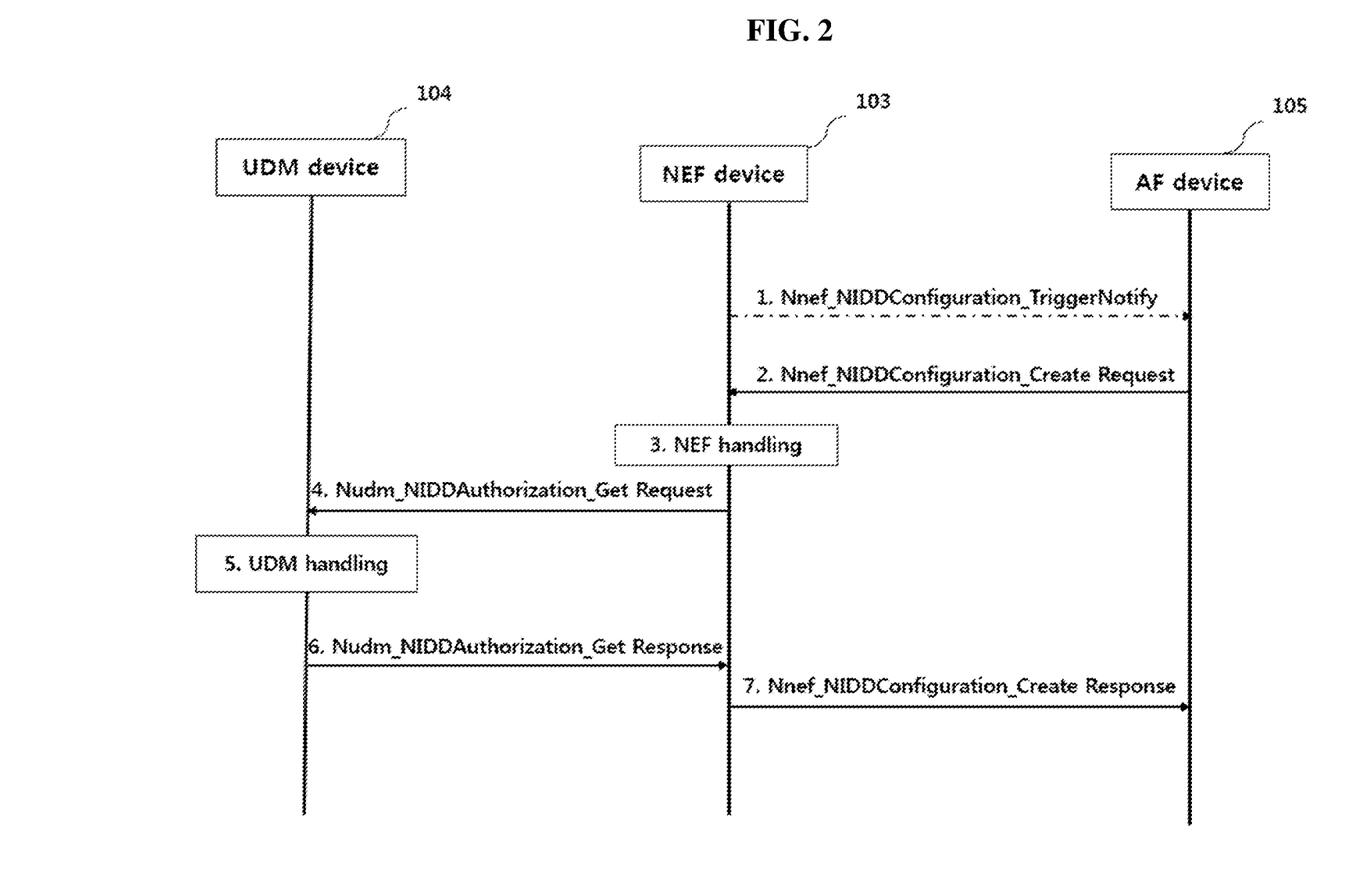
FIG. 2 is a flowchart illustrating a NIDD configuration process according to an embodiment of the present invention.

FIG. 2 is a flowchart illustrating a NIDD configuration process according to an embodiment of the present invention. FIG. 2 illustrates the procedure for configuring necessary information for data delivery via the NIDD API.

The NIDD Configuration procedure can be NEF initiated or AF triggered: in the former case the procedure starts at step 1, in the latter case it starts at step 2.

1. If the NEF requires a NIDD configuration with a given AF, then the NEF sends a Nnef_NIDDConfiguration_TriggerNotify (GPSI, AF ID, NEF ID) message to the AF for asking the Nnef_NIDDConfiguration_Create Request for the UE identified by the GPSI.

2. The AF sends a Nnef_NIDDConfiguration_Create Request message (GPSI or External Group Identifier, AF ID, NIDD Duration, T8 Destination Address, Requested Action, TLTRI (T8 Long Term Transaction Reference ID), Reliable Data Service Configuration, MTC Provider Information) to the NEF.

Reliable Data Service Configuration is an optional parameter that is used to configure the Reliable Data Service including port numbers for originator application(s) and receiver application(s). TLTRI is included in the Nnef_NIDDConfiguration_Create Request if the Requested Action is set to "Update" or "Cancel", otherwise TLTRI is not included in the Nnef_NIDDConfiguration_Create Request and the NEF assigns a TLTRI to the NIDD Configuration. If Reliable Data Service Configuration is present, the Reliable Data Service Configuration may include the mobile terminated and mobile originated serialization format(s) that are supported by the AF for each port number.

It is up to the AF to determine whether and if NIDD Duration can be set to never expire.

The AF is expected to be configured to use the same NEF as the one selected by the SMF during the UE's establishment of the PDU Session used for NEF based NIDD.

When more than one AF is associated with a PDU Session, the parameters that are provided in step 2 can be provisioned in the NEF based on operator policy or configuration. In which case, any parameters that are provided in step 2 and that conflict with the provisioned values are ignored.

If the AF does not indicate a serialization format, it is assumed that the UE application is provisioned to know what serialization format will be used for MT (mobile terminated) traffic or that the AF will use the same format that is used by the associated MO (mobile oriented) traffic.

3. If the Requested Action is set to "Cancel" it indicates that the purpose of the Nnef_NIDDConfiguration_Create Request is to cancel the transaction identified by TLTRI and the flow proceeds to step 7. If the Requested Action is set to "Update", the purpose of the transaction is to update the parameters associated with the configuration (i.e. Reliable Data Service).

If the Requested Action is not set to "Cancel" or "Update", Nnef_NIDDConfiguration_Create Request is for a new NIDD configuration and the NEF stores the received GPSI or External Group Identifier, AF ID, T8 Destination Address, and NIDD Duration. If either the AF is not authorised to perform this request (e.g. based on policies, if the SLA does not allow for it) or the Nnef_NIDDConfiguration_Create Request is malformed, the NEF performs step 7 and provides a Cause value appropriately indicating the error.

Depending on the configuration, the NEF may change the NIDD Duration.

4. The NEF sends a Nudm_NIDDAuthorisation_Get Request (GPSI or External Group Identifier, S-NSSAI, DNN, AF ID, MTC Provider Information) message to the UDM to authorise the NIDD configuration request for the received External Group Identifier or GPSI.

The NEF uses the AF ID, External Group Identifier or GPSI that was obtained in step 2 to determine what DNN will be used to enable transfer of unstructured data between the UE and the AF. This determination is based on local policies.

The MTC Provider Information in step 2 is an optional parameter. The NEF should validate the provided MTC Provider Information and may override it (the validated MTC Provider Information) to a NEF selected MTC Provider Information based on configuration. How the NEF determines the MTC Provider Information, if not present in step 2, is left to implementation (e.g., based on the requesting AF).

5. The UDM examines the Nudm_NIDDAuthorisation_Get Request message.

If the authorisation is successful and if an External Group Identifier was included in Nudm_NIDDAuthorisation_Get Request step 4, the UDM maps the External Group Identifier to an Internal-Group Identifier and a list of GPSIs and maps GPSIs to SUPIs and updates the NEF ID fields of the subscription data for the provided DNN and S-NSSAI with the requesting NEF's ID.

How the UDM selects a GPSI when multiple GPSIs are associated with the same SUPI is left to implementation, e.g., based on the MTC Provider Information (if received) or the default GPSI (if not received).

6. The UDM sends a Nudm_NIDDAuthorisation_Get Response (single value or list of (SUPI and GPSI), Result) message to the NEF to acknowledge acceptance of the Nudm_NIDDAuthorisation_Get Request. If the UDM determines that the list size exceeds the message capacity, the UDM shall segment the list and send it (the segmented list) in multiple messages. The SUPI(s) and, if available, the GPSI(s) (when Nnef_NIDDConfiguration_Create Request contains an GPSI) are returned by the UDM in this response. This allows the NEF to correlate the AF request received in step 2 of this procedure with the SMF-NEF Connection to be established for each UE or each group member UE.

7. The NEF sends a Nnef_NIDDConfiguration_Create Response (TLTRI, Maximum Packet Size, Reliable Data Service Indication, and Cause) message to the AF to acknowledge acceptance of the Nnef_NIDDConfiguration_Create Request. If the NIDD Configuration was accepted, the NEF assigns a TLTRI to the NIDD Configuration and sends it to the AF. The NEF creates an association between the TLTRI, GPSI or External Group Identifier, SUPI, and PDU session ID which is received from the SMF in step 2 of the SMF-NEF Connection procedure. In the MT NIDD procedure, the NEF will use TLTRI and either GPSI or External Group Identifier to determine the SUPI(s) and PDU session ID(s) of PDU Session(s) for delivering unstructured data. In the MO NIDD procedure, the NEF will use the SUPI(s) and PDU session ID(s) to obtain the TLTRI, GPSI. The Reliable Data Service Indication indicates if the Reliable Data Service is enabled in the NIDD configuration. The Maximum Packet Size is the maximum NIDD packet size.

<NIDD Authorization Update>

Figure 3:
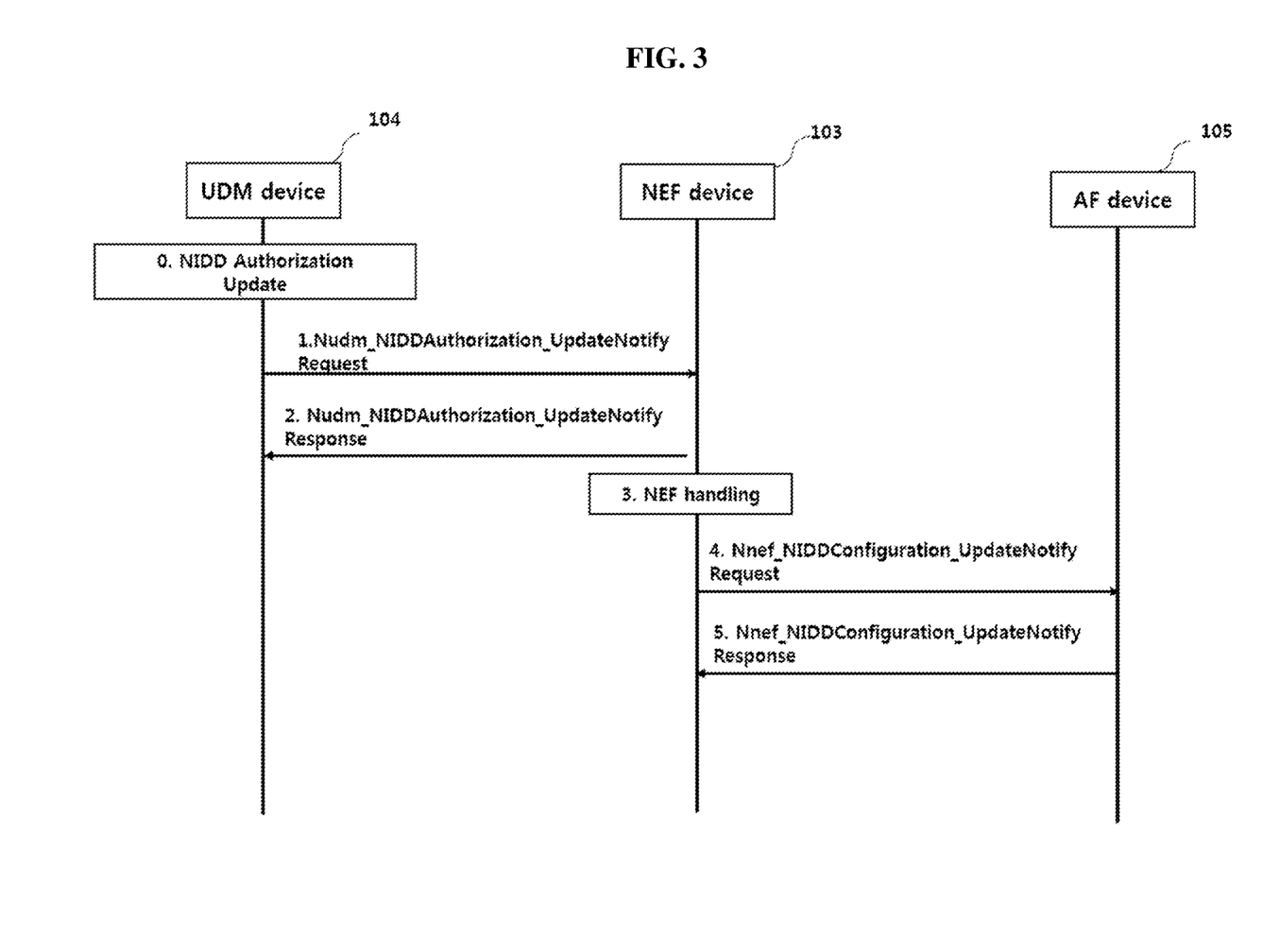
FIG. 3 is a flowchart illustrating a NIDD authorization update process according to an embodiment of the present invention.

FIG. 3 is a flowchart illustrating a NIDD authorization update process according to an embodiment of the present invention.

FIG. 3 illustrates the procedure for updating or revoking an existing NIDD Authorization. The UDM may initiate the NIDD Authorization Update procedure with the NEF to send updated Authorization information to the NEF.

1. The UDM may send a NIDD Authorization Update information using Nudm_NIDDAuthorisation_UpdateNotify Request (SUPI, GPSI, S-NSSAI, DNN, Result) message to the NEF to update an user's NIDD authorization.

2. The NEF sends Nudm_NIDDAuthorisation_UpdateNotify Response (cause) message to the UDM to acknowledge the authorization update.

3. If the authorization is removed, the NEF should initiate the SMF-NEF Connection release procedure.

4. The NEF informs the AF that the user's authorisation status has changed by sending Nnef_NIDDConfiguration_UpdateNotify Request (GPSI, TLTRI, Result) message to the AF.

5. The AF responds to the NEF with Nnef_NIDDConfiguration_UpdateNotify Response message.

Figure 4:
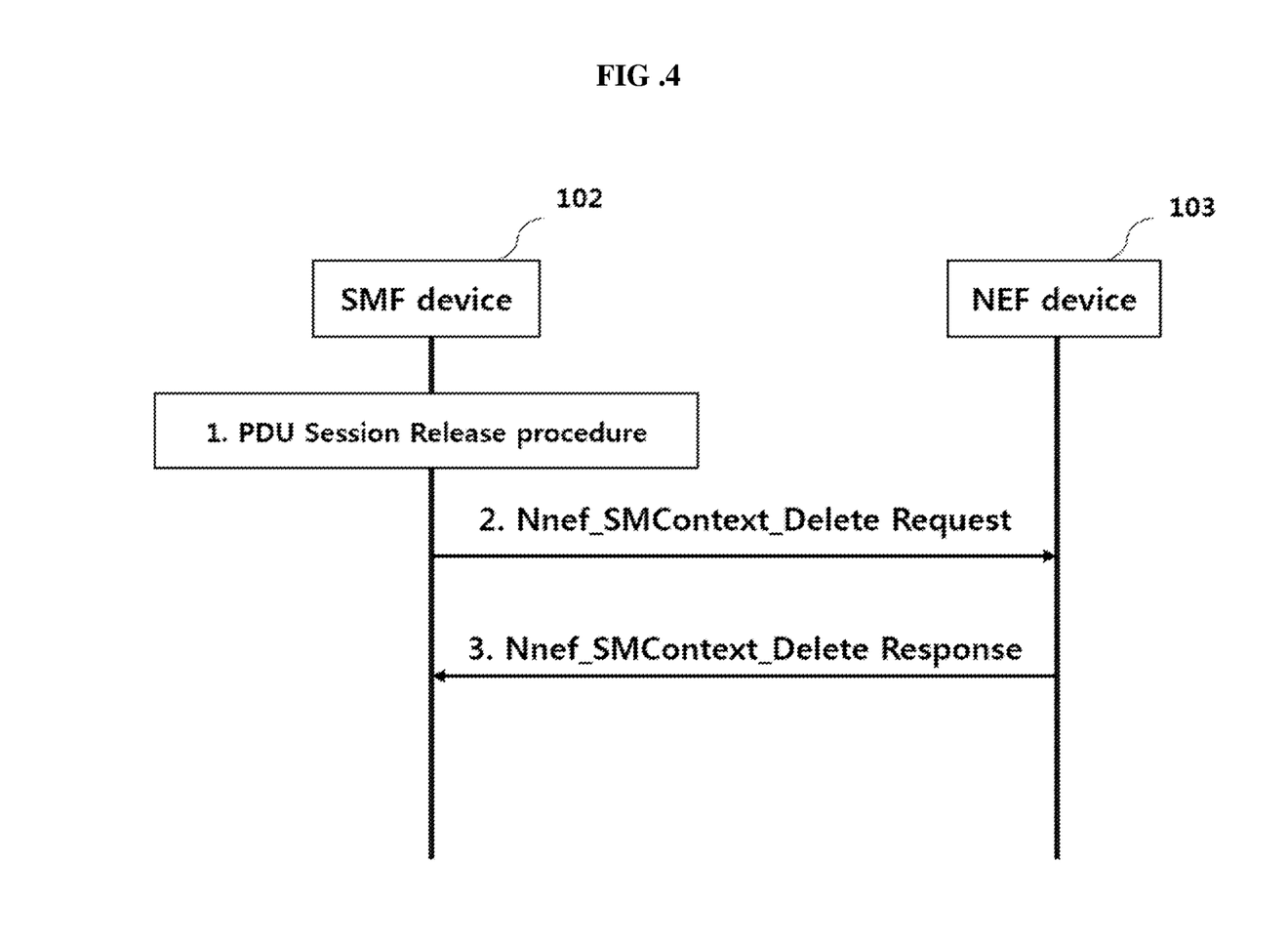
FIG. 4 is a flowchart illustrating a procedure for a connection release between an SMF device and a NEF device initiated by the SMF device according to an embodiment of the present invention.

FIG. 4 is a flowchart illustrating a procedure for a connection release between an SMF device and a NEF device initiated by the SMF device according to an embodiment of the present invention.

When the PDU Session Release is initiated and if a NEF has been selected as anchor of the Control Plane CIoT 5GS Optimization enabled PDU session which is Unstructured PDU Session Type, then the SMF initiates a SMF-NEF Connection Release procedure towards the NEF corresponding to the "NEF ID" for that DNN/S-NSSAI Combination.

1. The SMF performs PDU Session Release Procedure
2. If a NEF has been selected as anchor of the Control Plane CIoT 5GS Optimization enabled PDU session which is Unstructured PDU Session Type, the SMF initiates the SMF-NEF Connection release for this PDU Session by sending Nnef_SMContext_Delete Request (User Identity, PDU session ID, NEF ID, S-NSSAI, DNN) message to the NEF.
3. The NEF deletes the NEF PDU session Context associated with the User Identity and the PDU session ID. The NEF sends Nnef_SMContext_Delete Response (User Identity, PDU session ID, NEF ID, S-NSSAI, DNN) to the SMF confirming release of the SMF-NEF session for the UE.

<NEF Initiated SMF-NEF Connection Release Procedure>

NEF initiates a SMF-NEF connection release procedure in the following cases:
  when a NIDD Authorization Update Request from the UDM indicates that the User is no longer authorized for NIDD, or
  failure of AF or failure of AF connection, or
  based on a request from the AF.

Figure 5:
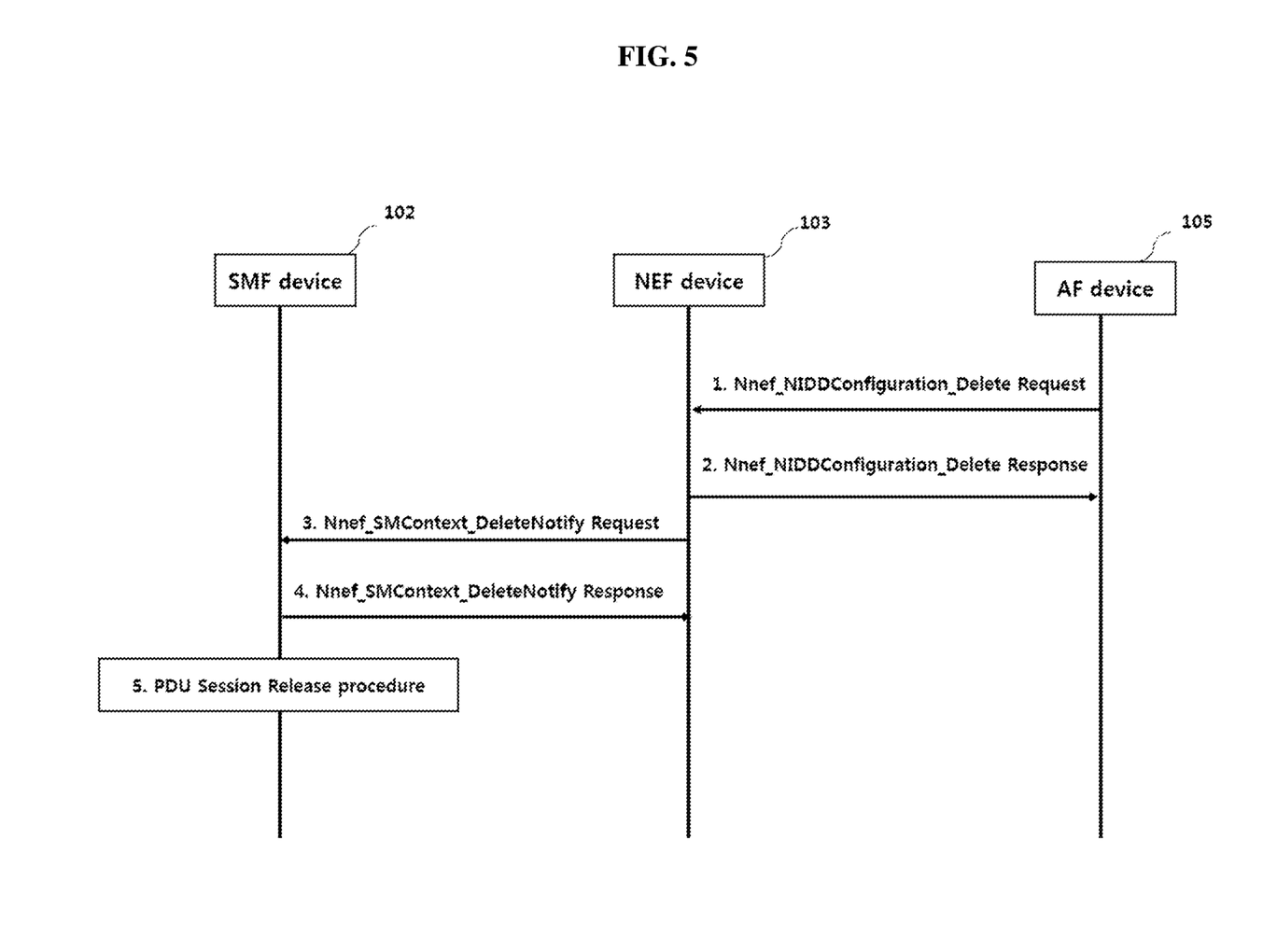
FIG. 5 is a flowchart illustrating a procedure for a connection release between an SMF device and a NEF device initiated by the NEF device based on a request of an AF device according to an embodiment of the present invention.

FIG. 5 is a flowchart illustrating a procedure for a connection release between an SMF device and a NEF device initiated by the NEF device based on a request of an AF device according to an embodiment of the present invention.

1. AF may indicate that SMF-NEF connection for a User's NIDD is no longer needed by invoking Nnef_NIDDConfiguration_Delete Request (TLTRI) toward NEF.
2. The NEF deletes the NEF PDU session Context associated with the TLTRI and acknowledges the deletion of the NIDD configuration by invoking Nnef_NIDDConfiguration_Delete Response to the AF.
3. The NEF notifies the deletion of the SM context information by invoking Nnef_SMContext_DeleteNotify Request toward the SMF.
4. The SMF acknowledges the notification by invoking Nnef_SMContext_DeleteNotify Response to the NEF.
5. If the PDU session is no longer needed, the SMF performs PDU Session Release Procedure.

Figure 6:
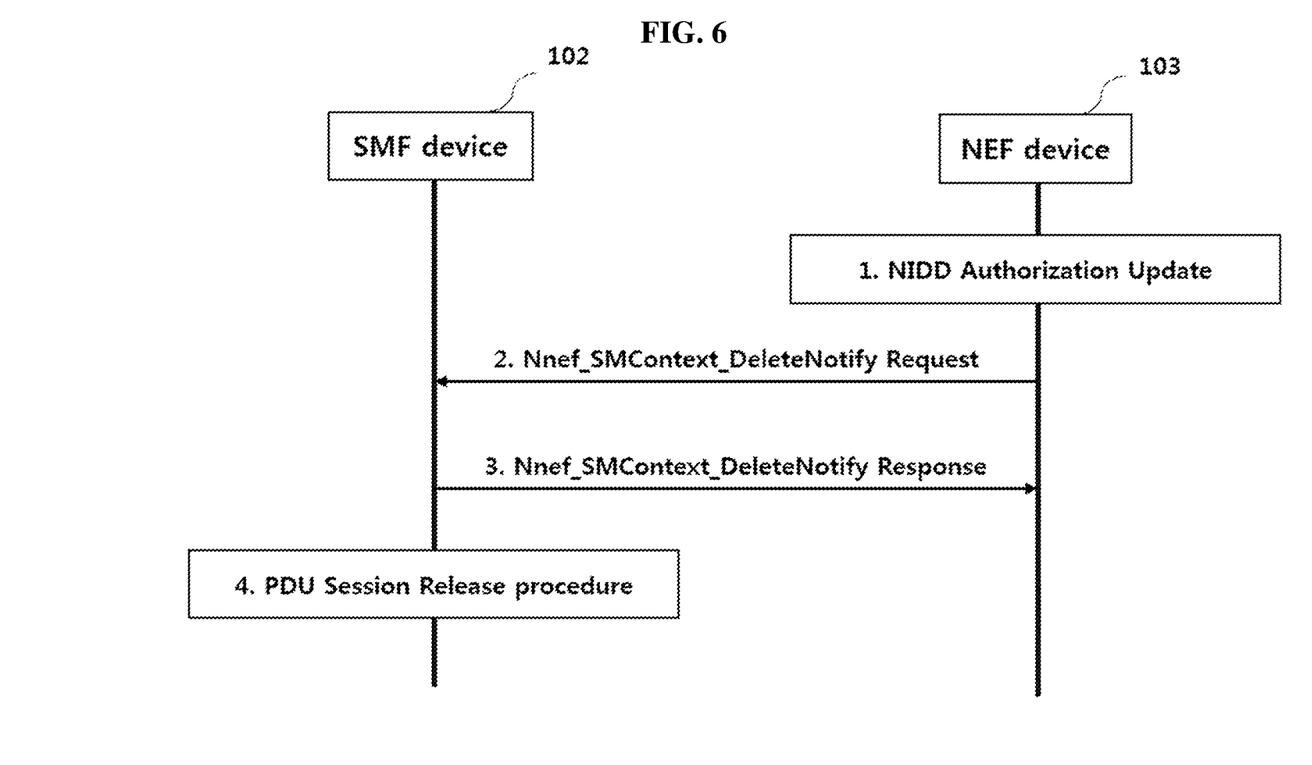
FIG. 6 is a flowchart illustrating a procedure for a connection release between an SMF device and a NEF device initiated by the NEF device based on a NIDD authorization update according to an embodiment of the present invention.

FIG. 6 is a flowchart illustrating a procedure for a connection release between an SMF device and a NEF device initiated by the NEF device based on a NIDD authorization update according to an embodiment of the present invention.

1. On NIDD Authorization Update by UDM, NEF may determine that it needs to release the corresponding SMF-NEF Connection.
2. The NEF deletes the corresponding NEF PDU session Context and notifies the deletion of the SM context information by invoking Nnef_SMContext_DeleteNotify Request toward the SMF.
3. The SMF acknowledges the notification by invoking Nnef_SMContext_DeleteNotify Response to the NEF.
4. If the PDU session is no longer needed, the SMF performs PDU Session Release Procedure.

<Nnef_NIDDConfiguration Service>

(1) Nnef_NIDDConfiguration_Create Service Operation
Service operation name: Nnef_NIDDConfiguration_Create
Description: This service operation is used by the consumer to request NIDD Configuration between NF consumer and NEF to support NIDD via NEF.
Inputs (optional): Reliable Data Service Configuration, Requested Action, TLTRI.
Inputs (required): GPSI or External Group Identifier, AF ID, NIDD Duration, T8 Destination Address, MTC Provider Information).
Outputs (required): TLTRI, Reliable Data Service Indication, Maximum Packet Size, Cause.
Outputs (optional): None.

(2) Nnef_NIDDConfiguration_TriggerNotify Service Operation
Service operation name: Nnef_NIDDConfiguration_TriggerNotify
Description: NEF triggers NIDD Configuration Create Request if there is no NIDD Configuration between NF consumer and NEF.
Inputs (required): GPSI, AF ID, NEF ID.
Outputs (required): None.

(3) Nnef_NIDDConfiguration_UpdateNotify Service Operation
Service operation name: Nnef_NIDDConfiguration_UpdateNotify
Description: This service operation is used by the NEF to notify NF consumer the NIDD Configuration Update due to NIDD Authorization Update.
Inputs (required): GPSI, TLTRI, Result.
Outputs (required): Cause.

(4) Nnef_NIDDConfiguration_Delete Service Operation
Service operation name: Nnef_NIDDConfiguration_Delete
Description: This service operation is used by the NF consumer to request NIDD Configuration delete between NF consumer and NEF to support NIDD via NEF.
Inputs (required): TLTRI.
Outputs (required): Cause.

<Nudm_NIDDAuthorisation Service>

(1) Nudm_NIDDAuthorisation_Get Service Operation
Service operation name: Nudm_NIDDAuthorisation_Get
Description: The NF consumer requests authorisation for NIDD Configuration.
Inputs (required): GPSI or External Group Identifier, DNN, S-NSSAI, MTC Provider Information).
Outputs (required): Single value or list of (SUPI, GPSI), Result.

(2) Nudm_NIDDAuthorisation_UpdateNotify Service Operation
Service operation name: Nudm_NIDDAuthorisation_UpdateNotify
Description: This service operation is used by the UDM to notify the NIDD Authorization Update to NF consumer.
Inputs (required): SUPI, GPSI, DNN, S-NSSAI, Result.
Outputs (required): Cause.

(3) Nnef_SMContext_Delete Service Operation
Service operation name: Nnef_SMContext_Delete
Description: This service operation is used by the NF consumer to request SMF-NEF Connection release between NF consumer and NEF to support NIDD via NEF.
Inputs (required): User Identity, PDU session ID, NEF ID, S-NSSAI, DNN.

(4) Nnef_SMContext_DeleteNotify Service Operation
Service operation name: Nnef_SMContext_DeleteNotify
Description: This service operation is used by the NEF to notify NF consumer that the SMF-NEF Connection for NIDD via NEF is no longer valid.

Inputs (required): User Identity, PDU session ID, NEF ID, S-NSSAI, DNN, Reason of the SMF-NEF connection release Outputs (required): Cause.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The units described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of Non-IP Data Delivery (NIDD) configuration performed by a Network Exposure Function (NEF) device, the method comprising:
    receiving a Nnef (NEF service-based interface) NIDD-Configuration_Create Request message from an Application Function (AF) device;
    receiving a Nudm (UDM service-based interface) NIDDAuthorisation_Get Request message to a Unified Data Management (UDM) device;
    receiving a Nudm_NIDDAuthorisation_Get Response message from the UDM device; and
    transmitting a Nnef_NIDDConfiguration_Create Response to the AF device, and
    wherein T8 Long Term Transaction Reference ID (TLTRI) is included in the Nnef NIDDConfiquration Create Request message if Requested Action is set to "Update" or "Cancel".

2. The method of claim 1, wherein the Nnef_NIDDConfiguration_Create Request message includes Generic Public Subscription Identifier (GPSI), External Group Identifier, AF device Identify (ID), NIDD Duration, T8 Destination Address, Requested Action, Reliable Data Service Configuration or Machine Type Communication (MTC) Provider Information, and
    wherein the Nnef_NIDDConfiguration_Create Response includes TLTRI, Maximum Packet Size, Reliable Data Service Indication, or Cause.

3. The method of claim 1, wherein the Nudm_NIDDAuthorisation_Get Request message includes GPSI, External Group Identifier, S-NSSAI, DNN, AF device ID or MTC Provider Information, and
    wherein the Nudm_NIDDAuthorisation_Get Response message includes single value or list of SUPI and GPSI or Result.

* * * * *